Figures 3, 4:
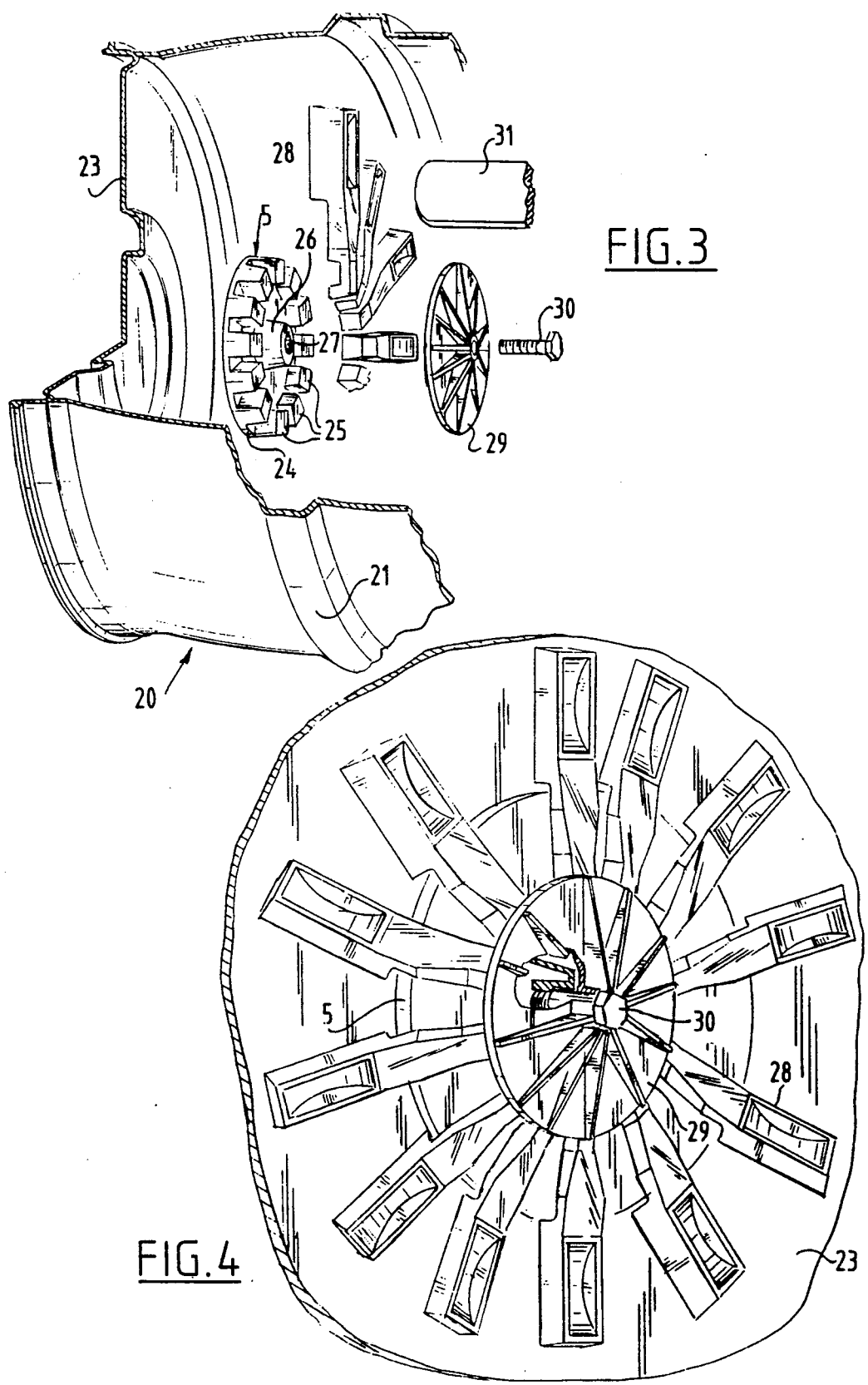

United States Patent [19]

Jonkers et al.

[11] Patent Number: 5,147,064
[45] Date of Patent: Sep. 15, 1992

[54] METHOD AND DEVICE FOR MANUFACTURING A PLASTIC CONTAINER WITH REINFORCED END WALLS

[75] Inventors: Godefridus H. J. Jonkers, Helmond; Cornelis J. Jansen, Rijen, both of Netherlands

[73] Assignee: Wiva Verpakkingen B.V., Netherlands

[21] Appl. No.: 726,805

[22] Filed: Jul. 8, 1991

[30] Foreign Application Priority Data

Jul. 10, 1990 [NL] Netherlands .................. 9001573

[51] Int. Cl.$^5$ ............................................. B65D 1/24
[52] U.S. Cl. ............................. 220/651; 220/592; 220/608; 220/644; 264/516
[58] Field of Search ............... 220/592, 604, 605, 606, 220/608, 626, 636, 643, 644, 645, 651, 652; 264/515, 516; 425/525

[56] References Cited

U.S. PATENT DOCUMENTS

| | | | |
|---|---|---|---|
| 3,919,373 | 11/1975 | Kormendi | 264/516 X |
| 4,396,562 | 8/1983 | Heaume | 264/516 X |
| 4,399,850 | 8/1983 | Schiemann | 220/653 |
| 4,587,074 | 5/1986 | De Loof | 264/516 |
| 4,719,072 | 1/1988 | Kojima et al. | 264/515 |
| 4,857,258 | 8/1989 | Le Doux et al. | 264/515 |
| 4,891,000 | 1/1990 | Ishii | 220/653 X |
| 4,911,878 | 3/1990 | Hopperdietzel | 264/516 |
| 4,941,583 | 7/1990 | Gerhard | 220/653 |
| 4,952,347 | 8/1990 | Kasugai | 264/516 X |

FOREIGN PATENT DOCUMENTS 1946737 3/1971 Fed. Rep. of Germany.
1354848 3/1965 France.

Primary Examiner—Stephen Marcus
Assistant Examiner—Stephen Cronin
Attorney, Agent, or Firm—Watson, Cole, Grindle & Watson

[57] ABSTRACT

A method and device for manufacturing in accordance with the blow-moulding process a container with connecting bottom, top and side walls from plastic material, wherein a parison B is arranged at predetermined temperature in a closable open mould 1, the mould is closed, pressure medium is fed into the parison B and the finished container is removed from the mould after cooling and opening, wherein prior to closing of the mould the parison is held around at least two disc-shaped elements 5,6 which are placed at a mutual interval and which are clamped fixedly between the mould elements when these are closed prior to pressure medium being supplied, and wherein the clamping action is exerted in axial direction of the parison in order to enclose the discs in the bottom and top walls 23 for forming of the container 1, such that the discs lie directly against the top and bottom wall of the container, and an element 31 like a stirring member extending over the full length of the container can be arranged between these discs, whereas the whole capacity of the container is moreover accessible from a central opening 12.

5 Claims, 2 Drawing Sheets

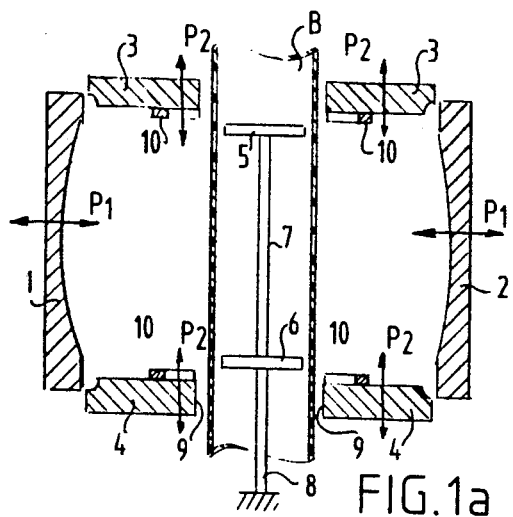
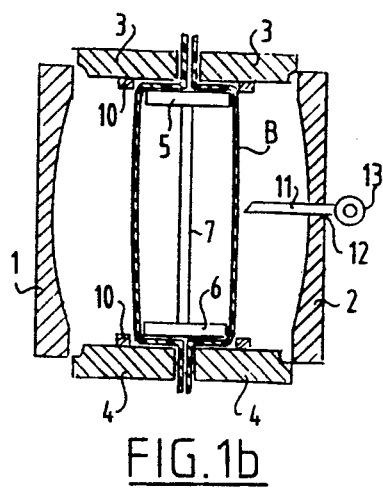
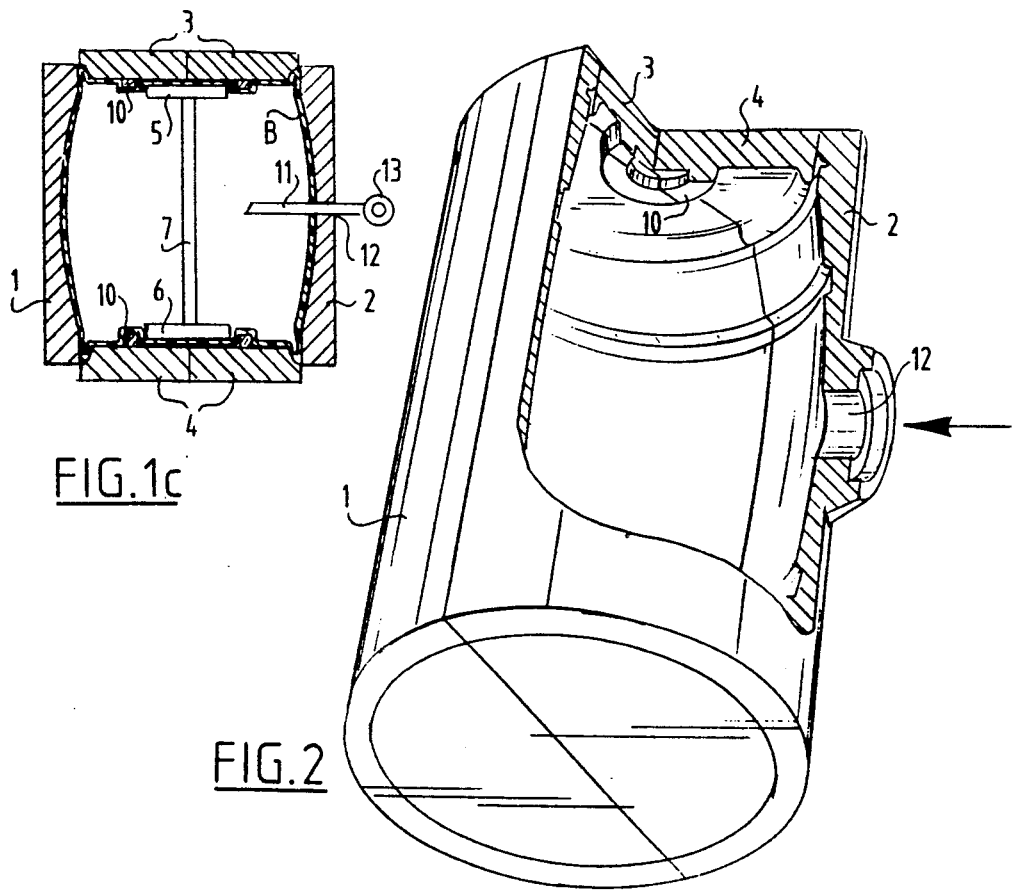
FIG.1a
FIG.1b
FIG.1c
FIG.2

METHOD AND DEVICE FOR MANUFACTURING A PLASTIC CONTAINER WITH REINFORCED END WALLS

The invention relates to a method for manufacturing in accordance with the blow-moulding process a container with connecting bottom, top and side walls from plastic material, wherein a parison is arranged at predetermined temperature in a closable open mould, the mould is closed, pressure medium is fed into the parison and the finished container is removed from the mould after cooling and opening, wherein prior to closing of the mould the parison is held around at least two disc-shaped elements which are placed at a mutual interval and which are clamped fixedly between the mould elements when these are closed prior to pressure medium being supplied.

Such a method is known from the German publication 1946737, wherein use is made of a mould consisting of two halves, wherein each half is provided with inward protruding ridges which come into contact with the periphery of the discs such that when the parison is shaped the discs afterwards remain between the side wall of the container. The discs herein lie in the centre of the container and because these discs serve to support elements to be arranged in the container, these elements can consequently extend only over a portion of the length or height of the container.

The invention has for its object to obviate the above stated drawback and provides thereto a method which is distinguished in that the clamping action is exerted in axial direction of the parison in order to enclose the discs in the bottom and top walls for forming of the container.

Owing to the fact that the discs now lie directly against the top and bottom wall of the container, an element extending over the full length of the container can be arranged between these discs. The whole capacity of the container is moreover accessible from a central opening.

The method according to the invention is further distinguished in that the container is provided with an opening in the side wall for removing a spacer between the discs that is required in manufacture and for arranging elements between the wall reinforcing disc-shaped elements.

The invention further relates to a device for performing above stated method, which device comprises two or more arched longitudinal portions which are radially movable relative to one another, and which device is distinguished in that each longitudinal portion has at either end a head end part axially movable relative thereto, which head end part forms together with the adjoining head end parts a closed continuous rib, the inner dimension of which is twice the wall thickness of the bottom or top wall of the container greater than the outer dimension of the disc-shaped element. Obtained herewith is a rigid connection between the disc-shaped element and the associated bottom and top wall of the container.

The invention further relates to the container obtained according to the method and/or device as stated above, which container is distinguished in that the disc is provided on the end remote from the container wall with means for receiving elements to be arranged in the container.

These can be for instance stirring means which, after manufacture of the container, can therefore be arranged therein and supported therein by the relevant discs.

Above mentioned and other features will be further elucidated in the description hereinbelow of an embodiment of the method and the container obtained with this method according to the invention.

In the drawing:

FIG. 1a, b and c each show a schematic lengthwise section of a mould with parison and reinforcing discs for arranging therein according to three successive stages in the manufacture of the container, FIG. 2 shows a view, partially with broken away parts, of a closed mould suitable for the method according to the invention, FIG. 3 shows a perspective view of the container obtained with a mould of FIG. 2 with the reinforcing disc for arranging therein and the assist elements for arranging thereon, FIG. 4 shows a perspective view corresponding with FIG. 3 of a detail of the reinforced bottom or top wall of the container.

The method according to the invention is further elucidated hereinbelow with reference to FIG. 1.

The mould suitable for the blow-moulding process for manufacturing a container from plastic material consists in the embodiment shown of two longitudinal portions 1, 2, wherein the longitudinal portions are each movable towards and away from one another in the direction of arrow P1. Each longitudinal portion is furthermore provided with two head end parts 3 and 4 respectively which are up and downward movable in the direction of the arrow P2 relative to the associated longitudinal portion 1, 2.

The driving and the guide paths for these parts are not shown in the figures and are assumed known to a person skilled in the art.

For shaping a container in a mould consisting of the longitudinal portions 1, 2 and head end parts 3, 4 a tubular parison of plastic material is fed between the longitudinal and head end portions, which tube is designated with B. The tube B can be of any suitable material, provided it can be deformed at a determined temperature by means of a pressure medium.

Arranged in tube B are two plate-like elements 5 and 6 which are held in position by a spacer 7 such that the plate-like elements 5, 6 are placed in the desired manner in the container for forming. The spacer 7 can be temporary and must be removed afterward from the container. It is further noted that the system of plate-like elements 5, 6 and spacer 7 is held at the correct height relative to the mould shells 1, 2 by a temporary support 8 of random type.

To close the mould the longitudinal portions 1, 2 together with the associated head end parts are pushed towards each other, whereby these head end parts 3 and 4 fold the tubular parison B inward below and above the plate-like elements 5, 6, see FIG. 1b. Before the head end parts 3 and 4 strike against one another with their sectional end face 9 the support 8 is removed, since the plate-like elements 5, 6 with spacer 7 are supported by the bottom head end parts 4. This situation is shown in FIG. 1b.

With further closing of the shell parts 1, 2 with head end parts 3, 4 a full closure can subsequently be obtained at the top and underside of the tubular parison B. By moving the head end parts 3, 4 towards one another according to the arrow P2 the upper and lower plate-like element 5, 6 is accurately positioned by means of ridges 10 arranged on the underside and upper part respectively of the head end parts 3, 4. These ridges 10 can also be embodied as curved, protruding ribs which form a continuous ring when the respective head end parts 3 and 4 are connected.

The shape of the continuous ring can be circular but may also have any other desired shape.

By inserting a lance 11 via a side opening 12 of a longitudinal portion 2 of the mould the interior of the parison B can be accessed and after connection to a pressure source 13 the pressure medium can carry the lance 11 into the parison B, whereafter this can be blown up until the plastic material nestles against the inner wall of the mould.

After removing the air pressure and releasing the mould portions in the reverse sequence to that described above, a container results that is provided with plate-like reinforcing elements in the top and bottom walls thereof.

The spacer 7 can be removed through the access opening in the arched side wall of the container obtained through the opening 12. In this manner only the plate-like head, in the embodiment shown in the form of elements embodied as discs, remains in the end faces on the inside of the container, which elements are each held fixedly between a continuous edge obtained due to the continuous rib 10.

A part of the finished container with reinforcing element 5 is shown in FIG. 3.

The container 20 is here embodied with an annular peripheral rib 21 which is formed in the groove-like recess 22 of the mould in FIG. 2 and which serves as running surface for supporting rollers when the container is used as stirring container. To this end the container 20 is revolved about its longitudinal axis which extends horizontally, whereby the content is set into rotating movement.

The end wall 23 of the container reinforced by the plate or disc-like elements 5 serves as support for assist elements, for instance stirring members, for arranging in the container 20.

The plate-like element 5 shown in FIG. 3 is embodied here as a circular disc 24 provided along the periphery with protrusions 25 placed at equal mutual intervals in a gear rim. The disc 24 is provided in the middle with a thickened hub 26 having a central threaded hole 27.

Used here as assist elements are a number of lever elements 28 which are received form-fitting between the protrusions 25 and which are provided at the free ends with a spoon-like end portion which extends radially relative to the reinforcing element 5. All elements 28 are held in place by means of a cover plate 29 which is screwed fixedly using a bolt 30 which is rotated into the threaded hole 27. This mounted position can be seen in detail in FIG. 4.

A stirring rod 31 can be clamped fixedly in each case between the spoon-like outer ends of two elements 28, so that in the embodiment shown twelve stirring rods 31 can be mounted in the container. The dimension of the elements 28, cover plate 29 and stirring rods 31 are such that they can all be placed via the side opening of the container.

Within the scope of the invention other elements can of course be arranged in the container 20 using suitably formed plate-like elements 5.

The plate-like elements 5 need not be circular but can also have a rectangular or square shape. The ridge-like continuous rib 10 in the mould may also be discontinuous, whereby a gear rim of protrusions is formed in the end surface 23 of container 20 for enclosing a plate-like reinforcing element 5.

We claim:

1. A blow-moulded container which includes two opposite end walls and a side wall extending between said opposite end walls, said end walls and said side wall defining an interior chamber within said container, each of said end walls including a ridge which extends into said interior chamber and a plate element, one of said two plate elements including support means for supporting construction elements which extend within said interior chamber.

2. A blow-moulded container according to claim 1, wherein said one plate element is disc shaped and wherein said support means comprises a plurality of protrusions which are spaced apart around a periphery of said plate element and extend into said interior chamber.

3. A blow-moulded container according to claim 2, including a plurality of clamping members which are respectively positioned between adjacent protrusions so as to extend radially with respect to said disc-shaped plate element.

4. A blow-moulded container according to claim 3, including a closing member connected to said plate element to fix said plurality of clamping members in place.

5. A blow-moulded container according to claim 1, wherein each of said two plate elements is disc shaped and includes a plurality of protrusions which are spaced apart around a periphery thereof and extend into said interior chamber, wherein a plurality of clamping members are respectively positioned between adjacent protrusions on each plate member so as to extend radially relative to said plate member, and including at least one stirring rod supported by and extending between corresponding clamping members attached to said two plate elements.

* * * * *